United States Patent
Fei et al.

(10) Patent No.: US 10,169,648 B2
(45) Date of Patent: Jan. 1, 2019

(54) METHOD AND DEVICE FOR INPUTTING HANDWRITING CHARACTER

(71) Applicant: MOTOROLA SOLUTIONS, INC., Chicago, IL (US)

(72) Inventors: Xun Fei, Chengdu (CN); Da-Jun Chen, Chengdu (CN); Wen Feng, Chengdu (CN); Ya-Hui Gong, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/535,190

(22) PCT Filed: Jan. 28, 2015

(86) PCT No.: PCT/CN2015/071755
§ 371 (c)(1),
(2) Date: Jun. 12, 2017

(87) PCT Pub. No.: WO2016/119146
PCT Pub. Date: Aug. 4, 2016

(65) Prior Publication Data
US 2017/0344817 A1    Nov. 30, 2017

(51) Int. Cl.
*G06K 9/00* (2006.01)
*G06F 3/0488* (2013.01)
*G06K 9/34* (2006.01)

(52) U.S. Cl.
CPC ..... *G06K 9/00422* (2013.01); *G06F 3/04883* (2013.01); *G06K 9/00416* (2013.01); *G06K 9/344* (2013.01); *G06K 2209/013* (2013.01)

(58) Field of Classification Search
CPC ........... G06K 9/00422; G06K 9/00416; G06K 9/344; G06F 3/04883
See application file for complete search history.

(56) References Cited

U.S. PATENT DOCUMENTS 5,500,937 A * 3/1996 Thompson-Rohrlich ................... G06F 3/04883
345/173
7,409,090 B2    8/2008 Akiyama
(Continued)

FOREIGN PATENT DOCUMENTS

CN    101183284         5/2008
CN    101311887 A      11/2008
(Continued)

OTHER PUBLICATIONS

International Search Report and The Written Opinion, International application No. PCT/CN2015/071755, filed Jan. 28, 2015, all pages.

*Primary Examiner* — David F Dunphy

(57) ABSTRACT

A method and an electronic device for inputting handwriting character are provided. The electronic device comprises a touch screen, a memory, and a processor. The processor is configured to perform the functions of the method. The method comprises steps of: adding a handwriting input on the touch screen; detecting a position of an initial point of the handwriting input; determining an input area for the handwriting input among the plurality of input areas of the touch screen based on the position of the initial point of the handwriting input; determining an operation of the handwriting input based on the position of the initial point of the handwriting input and performing the determined operation; and upon completion of the handwriting input, recognizing the input as a character and displaying the recognized character in the determined input area on the touch screen.

18 Claims, 10 Drawing Sheets

(56) References Cited

U.S. PATENT DOCUMENTS

| | | | |
|---|---|---|---|
| 7,720,316 B2 | 5/2010 | Shilman et al. | |
| 7,848,573 B2 | 12/2010 | Wecker et al. | |
| 7,907,779 B2 | 3/2011 | Kawamoto et al. | |
| 8,849,034 B2 | 9/2014 | Bhaskarabhatla | |
| 2005/0099406 A1* | 5/2005 | Pettiross | G06F 3/0236 345/179 |
| 2007/0146340 A1 | 6/2007 | Webb | |
| 2008/0273797 A1 | 11/2008 | Takikawa et al. | |
| 2009/0161958 A1* | 6/2009 | Markiewicz | G06F 3/0237 382/186 |
| 2012/0121181 A1 | 5/2012 | Markiewicz et al. | |
| 2014/0270529 A1 | 9/2014 | Sugiura | |
| 2015/0370477 A1* | 12/2015 | Kim | G06F 3/0486 715/769 |
| 2017/0010802 A1* | 1/2017 | Xia | G06K 9/00436 |

FOREIGN PATENT DOCUMENTS

| | | |
|---|---|---|
| CN | 1013118897 A | 11/2008 |
| CN | 102566933 | 7/2012 |
| JP | 06290299 | 10/1994 |
| JP | H06290299 A | 10/1994 |
| JP | 07200723 | 8/1995 |
| JP | H07200723 A | 8/1995 |
| JP | 2014089720 A | 5/2014 |
| KR | 20100023601 A | 3/2010 |
| KR | 1020100023601 A | 3/2010 |
| WO | 2014183677 A1 | 11/2014 |

\* cited by examiner

METHOD AND DEVICE FOR INPUTTING HANDWRITING CHARACTER

TECHNICAL FIELD

The present invention relates, in general, to handwriting, and in particular, to a method and a device for inputting handwriting character.

BACKGROUND OF THE INVENTION

Today a writing input device is becoming more and more popular. Users can easily make an input on a touch screen of an electronic device either by a finger or by a special input device such as a stylus.

However, a conventional operation of editing via handwriting input is not quite efficient and friendly. During editing, the user has to locate an input target before the actual input. That is, the conventional operation has two separate steps: 1) the user locates the input target by touching the intended input/editing area; and 2) after the input target gets located, the user can then start inputting or editing.

The same problem exists during the user corrects the input when the user input wrong character or the device wrongly recognized the input. In this case, the conventional operation has three separate steps: 1) the user has to locate the target on a specific area of the touch screen where an error occurs; 2) the user has to delete the wrong input (e.g., a character) before making a new input; and 3) then the user may make the new input, e.g., input a complete and correct character, at the same location.

Accordingly, there is a need for an efficient way of editing and correcting the handwriting input on the touch screen of the electronic device.

SUMMARY OF THE INVENTION

An aspect of the present invention provides a method for inputting handwriting character. The method comprises steps of: adding a handwriting input on a touch screen, where the touch screen has a plurality of input areas; detecting a position of an initial point of the handwriting input; determining an input area for the handwriting input among the plurality of input areas of the touch screen based on the position of the initial point of the handwriting input; determining an operation of the handwriting input based on the position of the initial point of the handwriting input and performing the determined operation; and upon completion of the handwriting input, recognizing the input as a character and displaying the recognized character in the determined input area on the touch screen.

Another aspect of the present invention provides an electronic device for inputting handwriting character. The device comprises a touch screen having a plurality of input areas, a memory configured to store non-transitory computer-executable instructions, and a processor, coupled to the memory and the touch screen, configured to perform a set of functions including: adding a handwriting input on the touch screen; detecting a position of an initial point of the handwriting input; determining an input area for the handwriting input among the plurality of input areas of the touch screen based on the position of the initial point of the handwriting input; determining an operation of the handwriting input based on the position of the initial point of the handwriting input and performing the determined operation; and upon completion of the handwriting input, recognizing the input as a character and displaying the recognized character in the determined input area on the touch screen.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
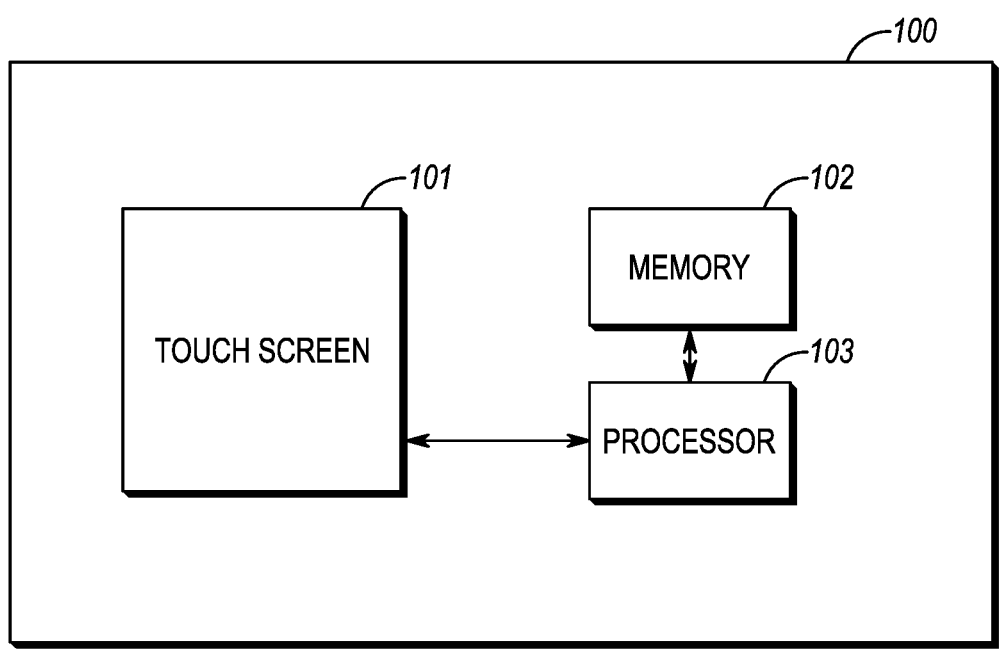
FIG. 1 is a block diagram illustrating an electronic device according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method and device components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present invention is directed to simplify the operation by combining the input target locating step with the user actual inputting/editing step. According to an embodiment of the present invention, the user may directly make a handwriting input on a touch screen and a position of an initial touch point of the input (in other words, a start of a first stroke of the input) is detected and the intended input area is determined based on the detected position. In this case, the detected position is determined as a point in the intended input area. There is no need for the user to "tell" the device where the user would make the handwriting input before the actual input operation. The device automatically determines the input area on the touch screen based on the detected position of the initial touch point of the input as long as the touch area is valid for input. The device may accept the input and recognize it and display the recognized result in the determined input area.

In the case of correcting an error input, the user may directly write the input on the error character without locating and deleting the error character in advance. The device may automatically determine the error character based on the detected position of the initial point of the input and replace it with a new input. In this embodiment, the position of the initial point of the input falls on the error character. During the correcting operation, in a preferred embodiment, after determining the error character, the device may automatically recognize the character by combine the original (error) character with the new input (stroke), e.g., by providing possible results to the user for choosing in the touch screen. After selection by the user or automatically, the new and correct character is displayed at the proper position (for example, in a word or a sentence) on the touch screen.

FIG. 1 is a block diagram illustrating an electronic device according to an embodiment of the present invention. As shown in FIG. 1, according to the embodiment of the present invention, the electronic device 100 includes a touch screen 101, a memory 102, and a processor 103. The touch screen 101 is well-know to the ordinary skilled in the art and is used to display or provide the information to the user on one hand and to make an input by the user on the other hand. The user may use one or more fingers, or a stylus, to make the input such as character(s). The memory 102 is used to store non-transitory computer-executable instructions. The processor 103 is coupled to the touch screen 101 and the memory 102. The processor 103 is configured to perform a set of functions which, when executed, cause the electronic device 100 to implement the embodiment of the present invention.

Figure 2A:
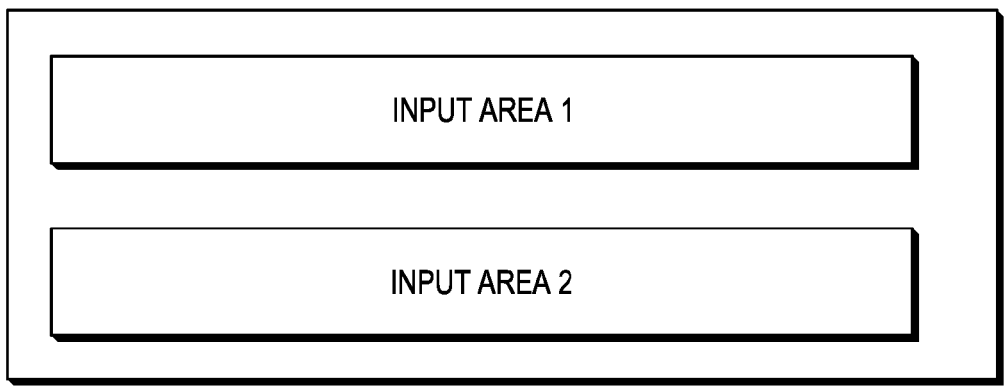
FIGS. 2A, 2B, and 2C show a first example of inputting handwriting character according to the embodiment of the present invention.
Figure 2B:
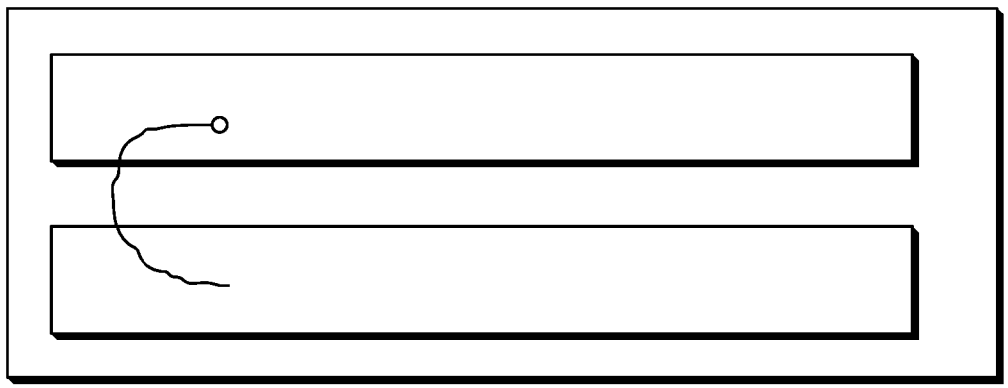
Figure 2C:
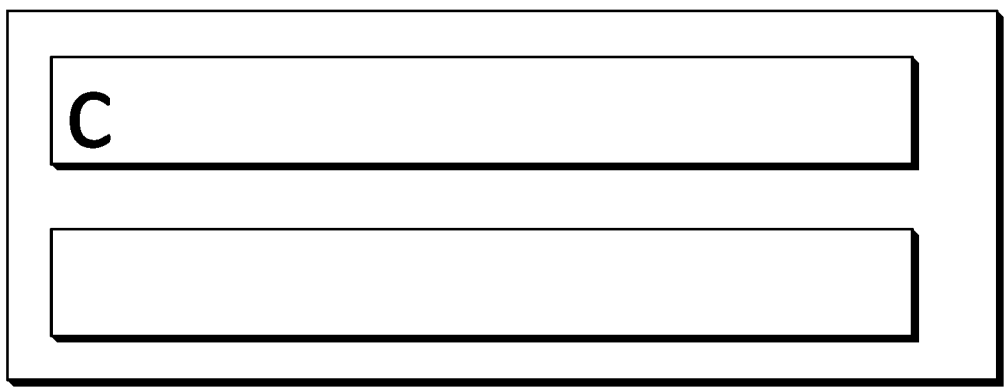

FIGS. 2A, 2B, and 2C show a first example of inputting handwriting character according to the embodiment of the present invention. The first example shows a case where the user starts writing a first character on the touch screen.

Referring to FIG. 2A, FIG. 2A shows two input areas—a first input area and a second input area (shown as "input area 1" and "input area 2" respectively)—in which the user may make the input, on the touch screen 101 of FIG. 1 in the first example. The ordinary skilled in the art should understand that, although only two input areas are shown in FIG. 2A (and also only two input areas are shown in FIGS. 2B, 2C, 3A, 3B, 4A, 4B, 5A, 5B, 6A, 6B, 6C, 7A, 7B, 7C, 8A, 8B, 8C, and 8D), the number of the input areas on the touch screen may be more than two, for example, three or four or etc. Moreover, although in the above figures, the input areas are arranged from top to bottom of the touch screen, the ordinary skilled in the art should understand that the input areas may be arranged from left to right of the touch screen, or in other proper directions or ways. Further, although in the above figures, the input areas are arranged in a rectangle shape, the ordinary skilled in the art should understand that the input areas may be arranged in other proper shapes such as triangle, square, diamond, circle, ellipse, or etc.

FIG. 2B shows a handwriting input by the user in the first example. As shown in FIG. 2B, the user directly starts writing a character on the touch screen at the intended input area. In this case, the user would like to write a character "c" in the first input area. As the user makes the input, the input is added and displayed on the touch screen so that the user can view what he or she is writing. As shown in FIG. 2B, since the position of the initial point of the input (a small circle shown in FIG. 2B) falls in the first input area, the first input area is determined as the input target, i.e., the intended input area. Referring to FIG. 2B, the user continues writing the character "c".

Upon completion of the input, the processor 103 of the electronic device 100 recognizes the input as the character "c". Since the first input area is determined as the intended input area, the recognized character "c" is displayed in the first input area, as shown in FIG. 2C.

Then, the use may correct the character "c" if it is a wrong character, or may continue writing another character after the character "c" or in another input area.

Figure 3A:
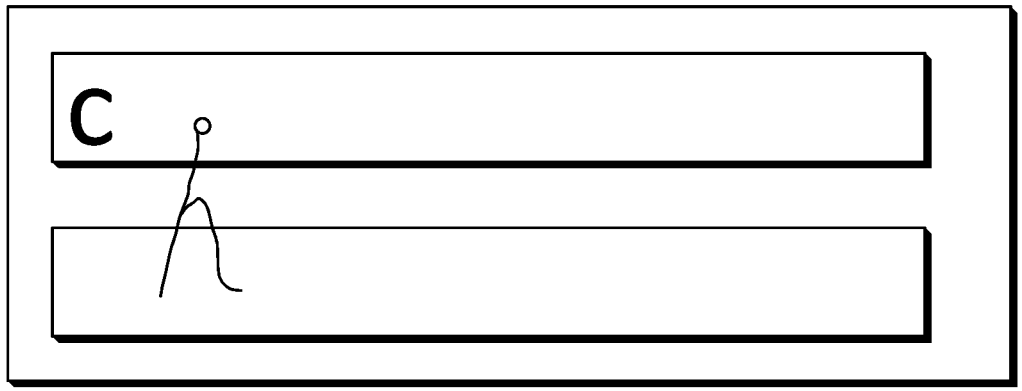
FIGS. 3A and 3B show a second example of inputting handwriting character according to the embodiment of the present invention.
Figure 3B:
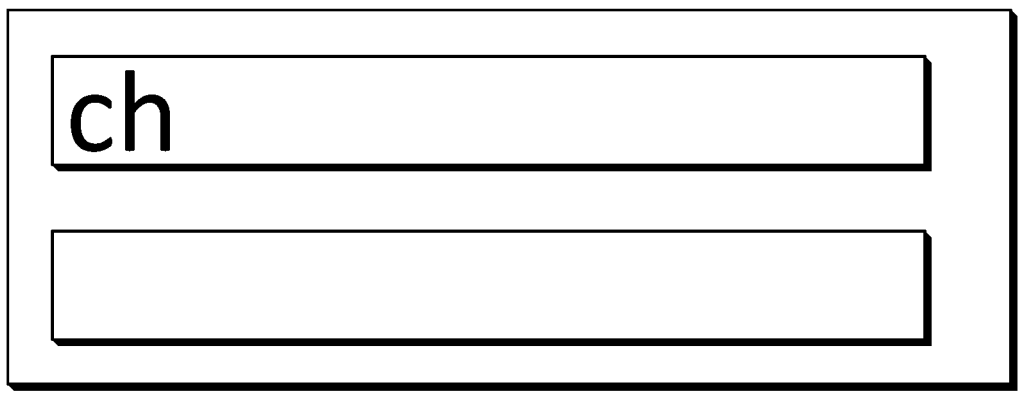

FIGS. 3A and 3B show a second example of inputting handwriting character according to the embodiment of the present invention. The second example shows a case where the user continues writing another character after the character "c".

FIG. 3A shows a handwriting input by the user in the second example. As shown in FIG. 3A, the user directly starts writing a character on the touch screen at the intended input area. In this case, the user would like to write a character "h" in the first input area and immediately after the existing character "c". As the user makes the input, the input is added on the touch screen so that the user can view what he or she is writing. As shown in FIG. 3A, since the position of the initial point of the input (a small circle shown in FIG. 3A) falls in the first input area, the first input area is determined as the input target, i.e., the intended input area. In addition, since the position of the initial point of the input is after the existing character "c", the processor 103 of the electronic device 100 determines that the user continues writing the character after the existing character. Referring to FIG. 3A, the user continues writing the character "h".

Upon completion of the input, the processor 103 of the electronic device 100 recognizes the new input as the character "h". Since the first input area is determined as the intended input area, and it is determined that the user continues writing the character after the existing character, the recognized character "h" is displayed in the first input area and immediately after the existing character "c", as shown in FIG. 3B. Referring to FIG. 3B, a character combination "ch" is displayed in the first input area on the touch screen.

Then, the use may correct any character of the character combination "ch" if there is a wrong character, may continue writing another character after the character "h" or in another input area, or may insert another character between the existing characters "c" and "h".

Figure 4A:
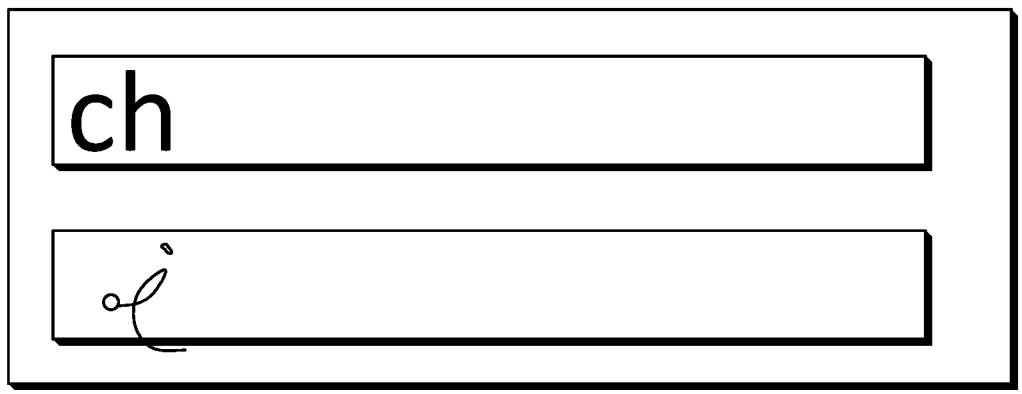
FIGS. 4A and 4B show a third example of inputting handwriting character according to the embodiment of the present invention.
Figure 4B:
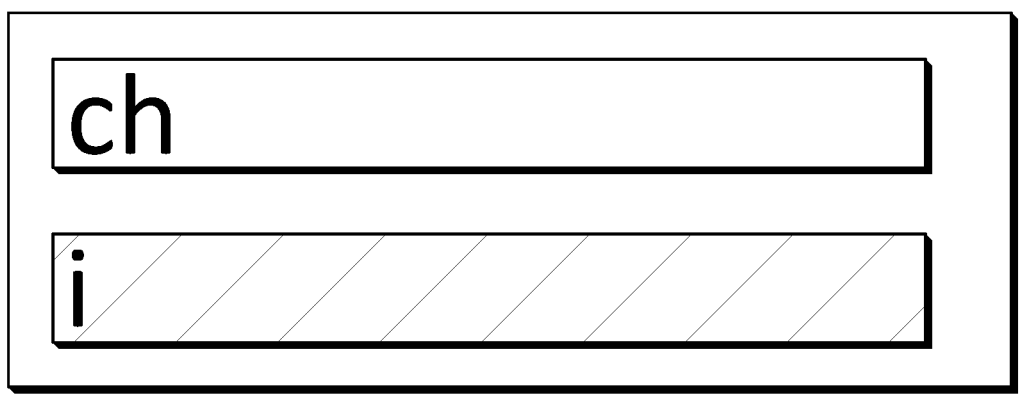

FIGS. 4A and 4B show a third example of inputting handwriting character according to the embodiment of the present invention. The third example shows a case where the user continues writing another character in another input area on the touch screen.

FIG. 4A shows a handwriting input by the user in the third example. As shown in FIG. 4A, the user directly starts writing a character on the touch screen at the intended input area. In this case, the user would like to write a character "i" in the second input area, instead of the first input area in which the character combination "ch" exists. As the user makes the input, the input is added on the touch screen so that the user can view what he or she is writing. As shown in FIG. 4A, since the position of the initial point of the input (a small circle shown in FIG. 4A) falls in the second input area, the second input area is determined as the input target, i.e., the intended input area. In addition, since the position of the initial point of the input is neither after any existing character nor between the characters, the processor 103 of the electronic device 100 determines that the user writes the first character in the second input area. Referring to FIG. 4A, the user continues writing the character "i".

Upon completion of the input, the processor 103 of the electronic device 100 recognizes the new input as the character "i". Since the second input area is determined as the intended input area, and it is determined that the user writes the first character in the second input area, the recognized character "i" is displayed in the second input area as the first character, as shown in FIG. 4B. Referring to FIG. 4B, a character combination "ch" is displayed in the first input area on the touch screen and the character "i" is displayed in the second input area on the touch screen.

Then, the use may correct any character of the character combination "ch" and the character "i" if there is a wrong character, may continue writing another character after the character "h" or "i", or may insert another character between the existing characters "c" and "h".

Figure 5A:
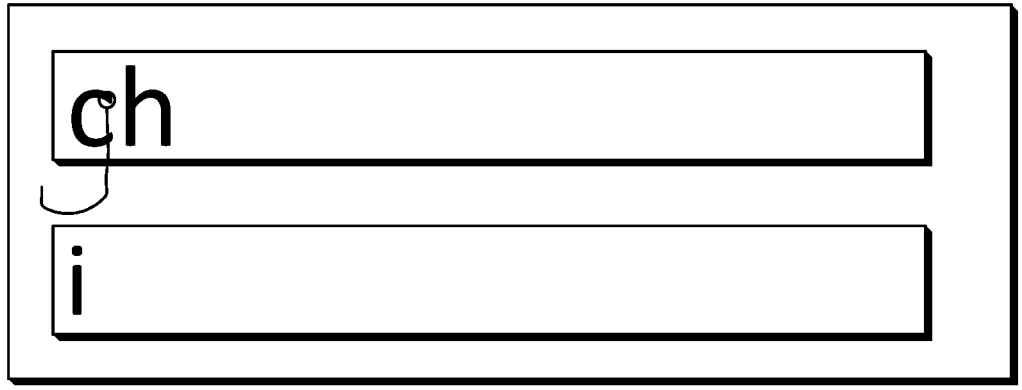
FIGS. 5A and 5B show a fourth example of inputting handwriting character according to the embodiment of the present invention.
Figure 5B:

FIGS. 5A and 5B show a fourth example of inputting handwriting character according to the embodiment of the present invention. The fourth example shows a case where the user corrects an existing character on the touch screen.

When an error input or a false recognition occurs, a correction operation is needed. According to the present invention, the user does not have to specify the input target, followed by a deletion operation and an insertion operation. Instead, the user may directly write the correct character on the touch screen and just make sure that the position of the initial point of the new input is right on the wrong character to be corrected.

FIG. 5A shows a handwriting input by the user in the fourth example. As shown in FIG. 5A, the user directly starts writing a character on the touch screen at the intended input area. In this case, the user would like to change the character "c" in the first input area to a character "g". As the user makes the input, the input is added on the touch screen so that the user can view what he or she is writing. As shown in FIG. 5A, since the position of the initial point of the input (a small circle shown in FIG. 5A) falls in the first input area, the first input area is determined as the input target, i.e., the intended input area. In addition, since the position of the initial point of the input is just on the character "c", the processor 103 of the electronic device 100 determines that the user corrects the existing character "c" in the first input area. Referring to FIG. 5A, the user makes a supplemental input to the existing character "c" to change it into the character "g".

In this case, the user does not have to make a complete character "g", but only makes the supplemental input. That is, a new stroke or a missing stroke is added onto the existing character without repeatedly inputting an existing stroke of the existing character. In this way, the new input is combined with the existing character "c" to form a new character "g". That is, the processor 103 of the electronic device 100 recognizes the new input as the character "g" by combining the new input with the existing (and correct) stroke of the existing character.

Although FIG. 5A shows a case where the user adds a new stroke onto the existing character to replace the existing character with a new character which is a combination of the new stroke and the existing (original) character, the ordinary skilled in the art should understand that the fourth example of inputting handwriting character according to the embodiment of the present invention, i.e., the correction operation, should also include another case where the user would like to change a wrong stroke of the existing character into a new and correct stroke so that the original and wrong character with the wrong stroke can be replaced with the new and correct character with the new and correct stroke. In the first case, i.e., in the case as shown in FIG. 5A, the existing character is corrected by directly adding a missing stroke onto the existing character without repeatedly inputting an existing and correct stroke of the existing character. In the second case, the existing character is corrected by directly replacing a wrong stroke with a new stroke without repeatedly inputting an existing and correct stroke of the existing character.

Since the first input area is determined as the intended input area, and it is determined that the user corrects the character "c", the newly recognized character "g" is displayed in the first input area and the existing character combination "ch" in the first input area is changed to "gh", as shown in FIG. 5B. Referring to FIG. 5B, a correct character combination "gh" is displayed in the first input area on the touch screen and the character "i" remains unchanged and is still displayed in the second input area on the touch screen.

Then, the use may continue correcting any character of the character combination "gh" and the character "i" if there is a wrong character, may continue writing another character after the character "h" or "i", or may insert another character between the existing characters "g" and "h".

Figure 6A:
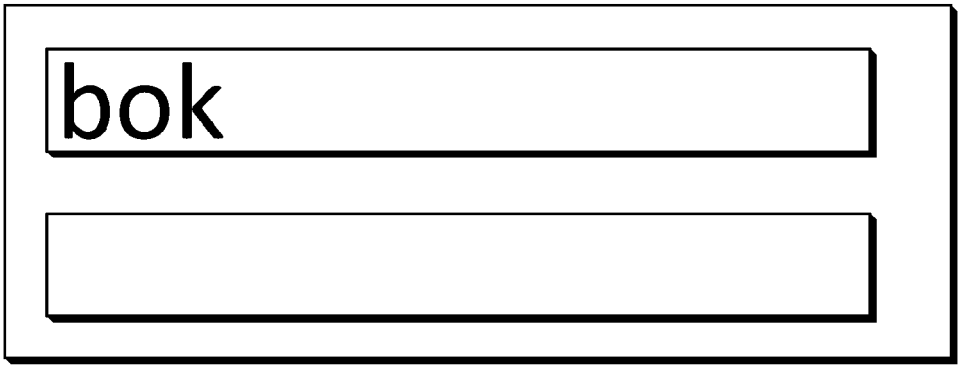
FIGS. 6A, 6B, and 6C show a fifth example of inputting handwriting character according to the embodiment of the present invention.
Figure 6B:
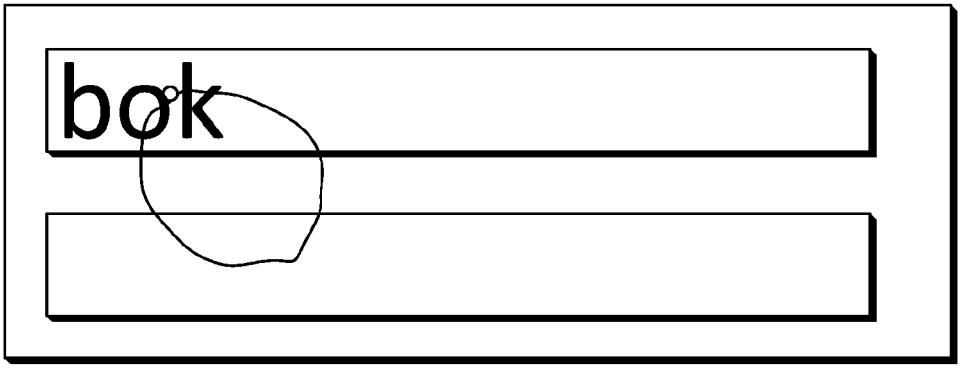
Figure 6C:

FIGS. 6A, 6B, and 6C show a fifth example of inputting handwriting character according to the embodiment of the present invention. The fifth example shows a case where the user inserts a character between two existing characters.

When a word is incorrectly input because, for example, a character is missed, the user may correct it by using the present invention. According to the present invention, the user does not have to accurately specify the input target within the whole word, as how the user normally does today. Instead, the user may directly start writing on the intended location, e.g., directly on the position where a character is missed, e.g., between two existing characters.

FIG. 6A shows a character combination "bok" having the existing character "b", "o", and "k" displayed in the first input area on the touch screen. In this case, the correct word should be "book", however a character "o" is missed between the characters "o" and "k".

FIG. 6B shows a handwriting input by the user in the fifth example. As shown in FIG. 6B, the user directly writes a character on the touch screen at the intended input area. In this case, the user would like to insert another character "o" between the existing characters "o" and "k" in the first input area. As the user makes the input, the input is added on the touch screen so that the user can view what he or she is writing. As shown in FIG. 6B, since the position of the initial point of the input (a small circle shown in FIG. 6B) falls in the first input area, the first input area is determined as the input target, i.e., the intended input area. In addition, since the position of the initial point of the input is between the existing characters "o" and "k", the processor 103 of the electronic device 100 determines that the user inserts a character between the existing characters in the first input area on the touch screen. Referring to FIG. 6B, the user continues writing the character "o".

Upon completion of the input, the processor 103 of the electronic device 100 recognizes the new input as the character "o". Since the first input area is determined as the intended input area, and it is determined that the user inserts a character between the existing characters, the recognized character "o" is displayed between the original characters "o" and "k" in the first input area, as shown in FIG. 6C. Referring to FIG. 6C, a character combination "book" is displayed in the first input area on the touch screen. That is, the wrong character combination "bok" is changed to a correct word "book" by inserting a character "o" between the original characters "o" and "k".

Then, the use may continue correcting any character of the character combination "book" if there is still a wrong character, may continue writing another character or another word after the character "k" or the character combination "book", or may insert another character between the existing characters "b" and "o", "o" and "o", and "o" and "k".

Figure 7A:
FIGS. 7A, 7B, and 7C show a sixth example of inputting handwriting character according to the embodiment of the present invention.
Figure 7B:
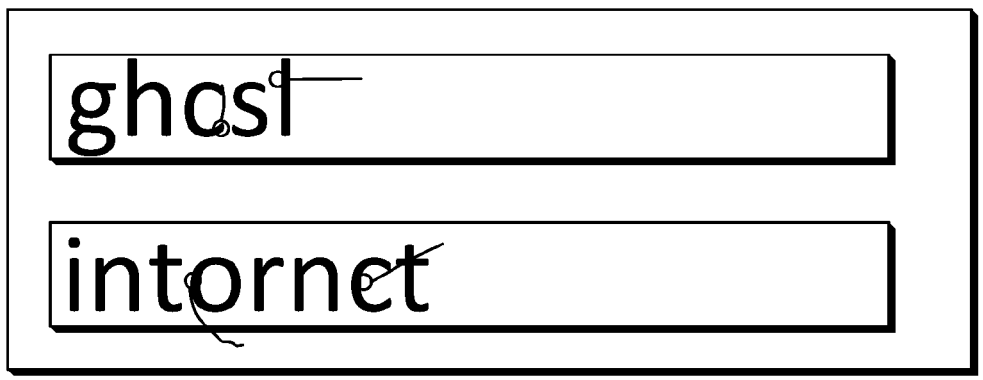
Figure 7C:
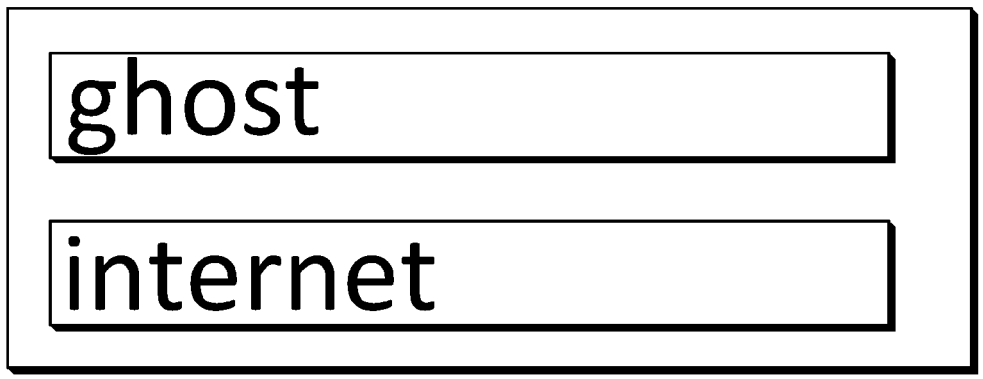

FIGS. 7A, 7B, and 7C show a sixth example of inputting handwriting character according to the embodiment of the present invention. The sixth example shows a case where the user corrects a plurality of characters in one word or in several words in different input areas on the touch screen.

A more complete scenario is shown in FIGS. 7A, 7B, and 7C, which illustrate how to correct a word with some error characters. Due to input error or false recognition, there may be several error characters in a word. For example, as shown in FIG. 7A, the word "ghost" in the first input area has two error characters "c" (should be "o") and "l" (should be "t"), and the word "internet" in the second input area also has two error characters "o" (should be "e") and "c" (should be "e"). According the present invention, without additional in-efficient operation of locating the error character, deleting it, and then inputting the correct one, the user may directly make an input on the error character, and even no need to write the whole character but just supplement the strokes, just like the user usually does on a paper. the electronic device of the present invention may automatically locate the error character and try to recognize the character again by combining the new stroke with the original (error) character to get a new result. The original character may be replaced with the new result. By this way, the correction operation would be much more efficient than how the user does today.

FIG. 7B shows a handwriting input by the user in the sixth example. As shown in FIG. 7B, the user directly starts writing a character on the touch screen at the intended input area. In this case, the user would like to change the characters "c" and "l" in the first input area to the correct characters "o" and "t", and change the characters "o" and "c" in the second input area to the correct characters "e" and "e" respectively. As the user makes the input, the input is added on the touch screen so that the user can view what he or she is writing.

As shown in FIG. 7B, for the error character "c" of the character combination "ghcsl", since the position of the initial point of the input (a first small circle shown in FIG. 7B) falls in the first input area, the first input area is determined as the input target, i.e., the intended input area. In addition, since the position of the initial point of the input is just on the character "c", the processor 103 of the electronic device 100 determines that the user corrects the existing character "c" in the first input area. Referring to FIG. 7B, the user makes a supplemental input to the existing character "c" to change it into the character "o".

In this case, the user does not have to make a complete character "o", but only makes the supplemental input. That is, a new stroke or a missing stroke is added onto the existing character without repeatedly inputting an existing stroke of the existing character. In this way, the new input is combined with the existing character "c" to form a new character "o". That is, the processor 103 of the electronic device 100 recognizes the new input as the character "o" by combining the new input with the existing (and correct) stroke of the existing character.

As shown in FIG. 7B, for the error character "l" of the character combination "ghcsl", since the position of the initial point of the input (a second small circle shown in FIG. 7B) falls in the first input area, the first input area is determined as the input target, i.e., the intended input area. In addition, since the position of the initial point of the input is just on the character "l", the processor 103 of the electronic device 100 determines that the user corrects the existing character "l" in the first input area. Referring to FIG. 7B, the user makes a supplemental input to the existing character "l" to change it into the character "t".

In this case, the user does not have to make a complete character "t", but only makes the supplemental input. That is, a new stroke or a missing stroke is added onto the existing character without repeatedly inputting an existing stroke of the existing character. In this way, the new input is combined with the existing character "l" to form a new character "t". That is, the processor 103 of the electronic device 100 recognizes the new input as the character "t" by combining the new input with the existing (and correct) stroke of the existing character.

As shown in FIG. 7B, for the error character "o" of the character combination "intornct", since the position of the initial point of the input (a third small circle shown in FIG. 7B) falls in the second input area, the second input area is determined as the input target, i.e., the intended input area. In addition, since the position of the initial point of the input is just on the character "o", the processor 103 of the electronic device 100 determines that the user corrects the existing character "o" in the second input area. Referring to FIG. 7B, the user makes a supplemental input to the existing character "o" to change it into the character "e".

In this case, the user does not have to make a complete character "e", but only makes the supplemental input. That is, a new stroke or a missing stroke is added onto the existing character without repeatedly inputting an existing stroke of the existing character. In this way, the new input is combined with the existing character "o" to form a new character "e". That is, the processor 103 of the electronic device 100 recognizes the new input as the character "e" by combining the new input with the existing (and correct) stroke of the existing character.

As shown in FIG. 7B, for the error character "c" of the character combination "intornct", since the position of the initial point of the input (a fourth small circle shown in FIG. 7B) falls in the second input area, the second input area is determined as the input target, i.e., the intended input area. In addition, since the position of the initial point of the input is just on the character "c", the processor 103 of the electronic device 100 determines that the user corrects the existing character "c" in the second input area. Referring to FIG. 7B, the user makes a supplemental input to the existing character "c" to change it into the character "e".

In this case, the user does not have to make a complete character "e", but only makes the supplemental input. That is, a new stroke or a missing stroke is added onto the existing character without repeatedly inputting an existing stroke of the existing character. In this way, the new input is combined with the existing character "c" to form a new character "e". That is, the processor 103 of the electronic device 100 recognizes the new input as the character "e" by combining the new input with the existing (and correct) stroke of the existing character.

Although FIG. 7B shows a case where the user adds a new stroke onto the existing character to replace the existing character with a new character which is a combination of the new stroke and the existing (original) character, the ordinary skilled in the art should understand that the sixth example of inputting handwriting character according to the embodiment of the present invention, i.e., the correction operation, should also include another case where the user would like to change a wrong stroke of the existing character into a new and correct stroke so that the original and wrong character with the wrong stroke can be replaced with the new and correct character with the new and correct stroke. In the first case, i.e., in the case as shown in FIG. 7B, the existing character is corrected by directly adding a missing stroke onto the existing character without repeatedly inputting an existing and correct stroke of the existing character. In the second case, the existing character is corrected by directly replacing a wrong stroke with a new stroke without repeatedly inputting an existing and correct stroke of the existing character.

Since it is determined that the user corrects the characters "c" and "l" in the first input area and the characters "o" and "c" in the second input area, the newly recognized characters "o" and "t" in the first input area and the newly recognized characters "e" and "e" are displayed in the first input area and the second input area respectively and the existing character combination "ghcsl" in the first input area and the existing character combination "intornct" in the second input area are changed to the correct word "ghost" and the correct word "internet" respectively, as shown in FIG. 7C. Referring to FIG. 7C, the correct words "ghost" and "internet" are respectively displayed in the first input area and the second input area on the touch screen.

The present invention is typically useful for the non-English languages, like Chinese, or other ideographic languages such as Japanese. Such languages have complex shapes and normally require more strokes for one character. People may prefer to use handwriting input method on an English based input device when applicable, where the present invention can improve input efficiency much more greatly.

FIGS. 8A, 8B, 8C, and 8D show a seventh example of inputting handwriting character according to the embodiment of the present invention. The seventh example shows a case where the user corrects an existing Chinese character on the touch screen. Although FIGS. 8A, 8B, 8C, and 8D relate to a correction operation, the ordinary skilled in the art should understand that, besides the correction operation, all other operations illustrated in above figures are also applicable to the Chinese character.

Figure 8A:
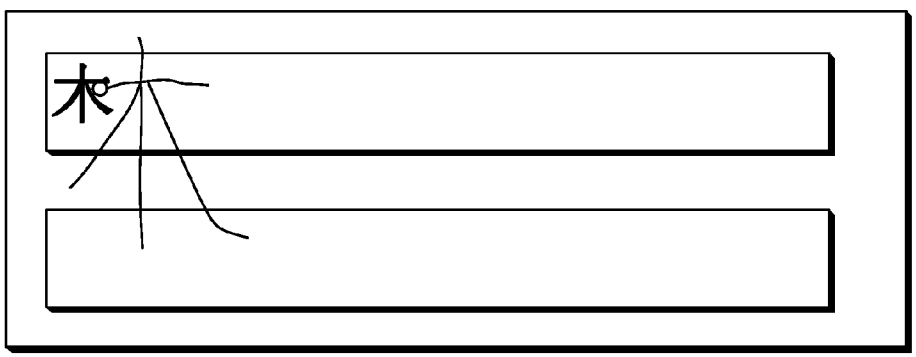
FIGS. 8A, 8B, 8C, and 8D show a seventh example of inputting handwriting character according to the embodiment of the present invention.

FIG. 8A shows a handwriting input by the user in the seventh example. As shown in FIG. 8A, the user directly starts writing a Chinese character on the touch screen at the intended input area. In this case, the user would like to change the Chinese character "木" in the first input area to another Chinese character "林". As the user makes the input, the input is added on the touch screen so that the user can view what he or she is writing. As shown in FIG. 8A, since the position of the initial point of the input (a small circle shown in FIG. 8A) falls in the first input area, the first input area is determined as the input target, i.e., the intended input area. In addition, since the position of the initial point of the input is just on the character "木", the processor 103 of the electronic device 100 determines that the user corrects the existing character "木" in the first input area. Referring to FIG. 8A, the user makes a supplemental input to the existing character "木" to change it into the character "林".

In this case, the user does not have to make a complete character "林", but only makes the supplemental input. That is, one or more new strokes or one or more missing strokes are added onto the existing character without repeatedly inputting an existing stroke of the existing character. In this way, the new input is combined with the existing character "木" to form a new character "林". That is, the processor 103 of the electronic device 100 recognizes the new input as the character "林" by combining the new input with the existing (and correct) stroke of the existing character "木".

Figure 8B:
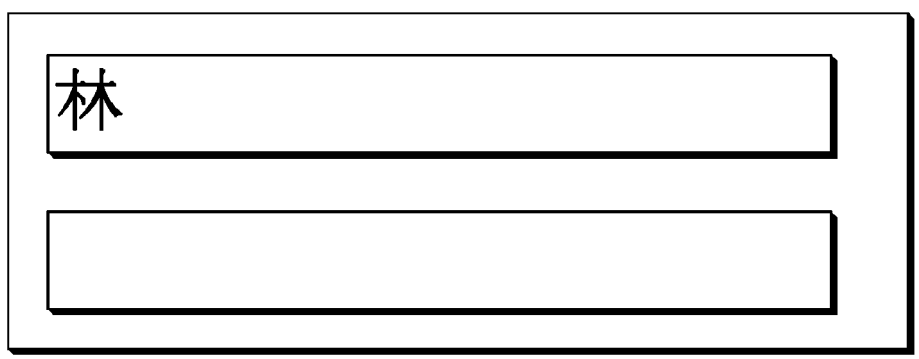

Since the first input area is determined as the intended input area, and it is determined that the user corrects the character "木", the newly recognized character "林" is displayed in the first input area and the existing character "木" in the first input area is replaced with "林", as shown in FIG. 8B. Referring to FIG. 8B, a correct character "林" is displayed in the first input area on the touch screen.

Figure 8C:
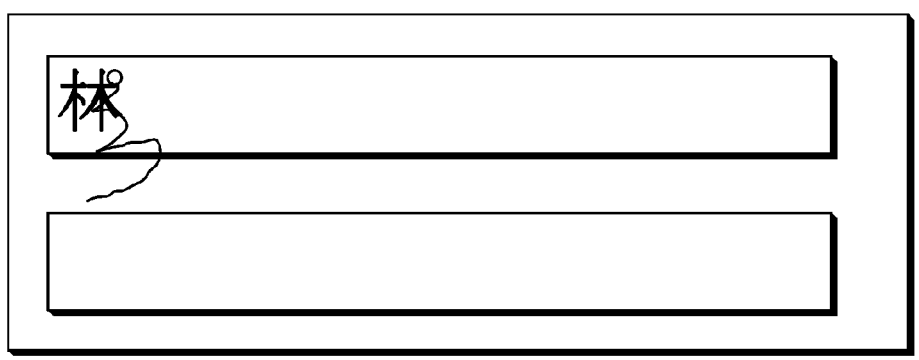

FIG. 8C continues showing the handwriting input by the user in the seventh example. As shown in FIG. 8C, the user directly starts writing a Chinese character on the touch screen at the intended input area. In this case, the user would like to change the Chinese character "林" in the first input area to another Chinese character "彬". As the user makes the input, the input is added on the touch screen so that the user can view what he or she is writing. As shown in FIG. 8C, since the position of the initial point of the input (a small circle shown in FIG. 8C) falls in the first input area, the first input area is determined as the input target, i.e., the intended input area. In addition, since the position of the initial point of the input is just on the character "林", the processor 103 of the electronic device 100 determines that the user corrects the existing character "林" in the first input area. Referring to FIG. 8C, the user makes a supplemental input to the existing character "林" to change it into the character "彬".

In this case, the user does not have to make a complete character "彬", but only makes the supplemental input. That is, one or more new strokes or one or more missing strokes are added onto the existing character without repeatedly inputting an existing stroke of the existing character. In this way, the new input is combined with the existing character "林" to form a new character "彬". That is, the processor 103 of the electronic device 100 recognizes the new input as the character "彬" by combining the new input with the existing (and correct) stroke of the existing character "林".

Figure 8D:
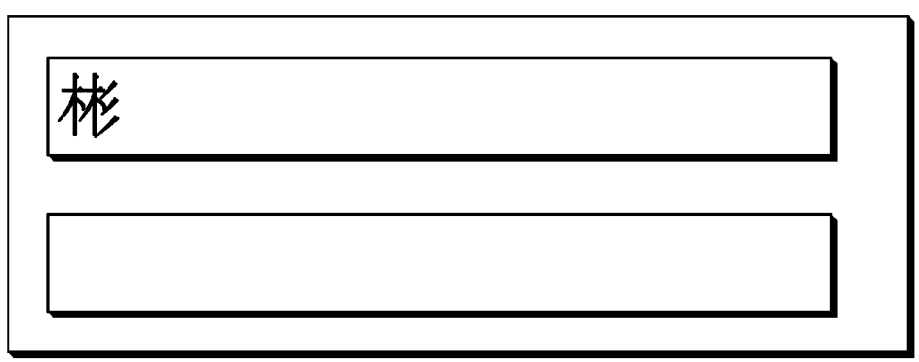

Since the first input area is determined as the intended input area, and it is determined that the user corrects the character "林", the newly recognized character "彬" is displayed in the first input area and the existing character "林" in the first input area is replaced with "彬" as shown in FIG. 8D. Referring to FIG. 8D, a correct character "彬" is displayed in the first input area on the touch screen.

Although FIGS. 8A and 8C show the case where the user adds a new stroke onto the existing character to replace the existing character with a new character which is a combination of the new stroke and the existing (original) character, the ordinary skilled in the art should understand that the seventh example of inputting handwriting character according to the embodiment of the present invention, i.e., the correction operation, should also include another case where the user would like to change a wrong stroke of the existing character into a new and correct stroke so that the original and wrong character with the wrong stroke can be replaced with the new and correct character with the new and correct stroke. In the first case, i.e., in the case as shown in FIGS. 8A and 8C, the existing character is corrected by directly adding a missing stroke onto the existing character without repeatedly inputting an existing and correct stroke of the existing character. In the second case, the existing character is corrected by directly replacing a wrong stroke with a new stroke without repeatedly inputting an existing and correct stroke of the existing character.

Then, the use may continue correcting the character "彬" if it is a wrong character, or may continue writing another character after the character "彬".

Figure 9:
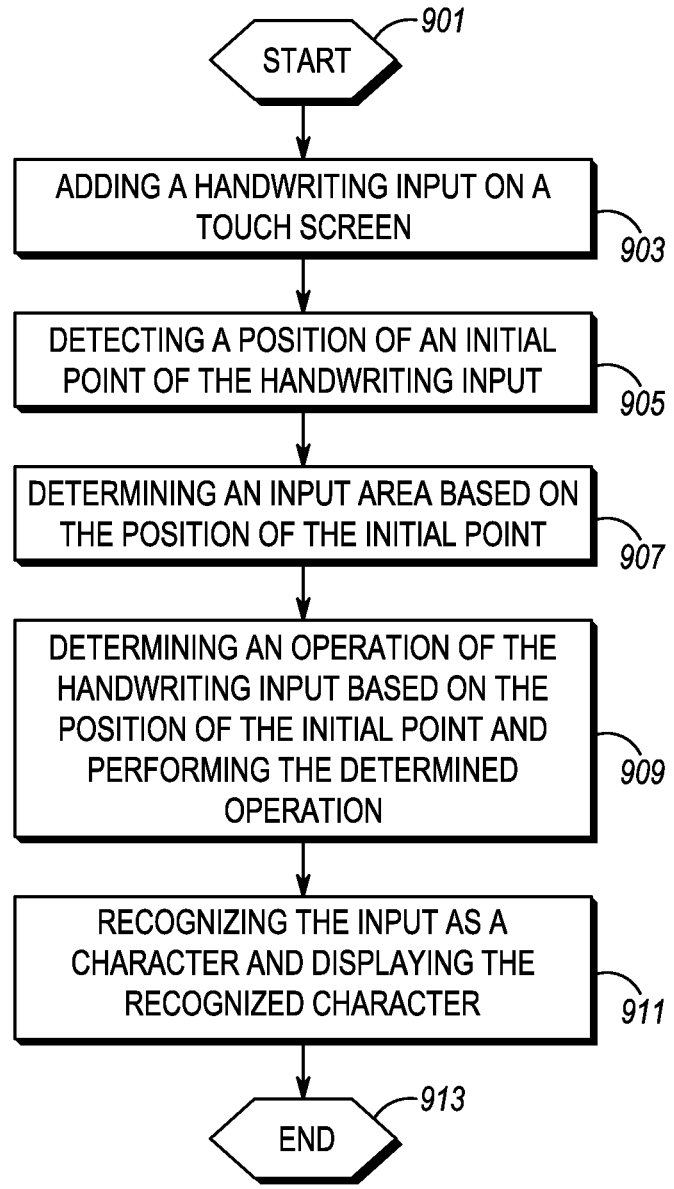
FIG. 9 is a flowchart illustrating a method for inputting handwriting character according to the embodiment of the present invention.

FIG. 9 is a flowchart illustrating a method for inputting handwriting character according to the embodiment of the present invention.

The method according to the embodiment of the present invention starts at 901 in FIG. 9.

At 903, a handwriting input is added on a touch screen. As shown in FIGS. 2-8, the user directly makes the input in the intended input area on the touch screen. As the user makes the input, the input is added on the touch screen so that the user can view what he or she is writing.

At 905, a position of an initial point of the handwriting input is detected. The position of the initial point of the input will be used to determine both the intended input area and the operation of the input.

At 907, an input area is determined based on the position of the initial point of the handwriting input. For example, if the position of the initial point of the handwriting input falls in the first input area, the first input area is determined as the intended input area.

At 909, an operation of the handwriting input is determined based on the position of the initial point of the handwriting input, and then the determined operation is performed. For example, if the position of the initial point of the input falls on an existing character, the operation of the input is determined as a correction operation. In this operation, the existing character is replaced with a new character. The detailed description is made later with reference to FIG. 10.

At 911, the handwriting input is recognized as a new character and the recognized character is displayed in the input area determined at 907 on the touch screen. In the case of correcting the character, the input is recognized as the new character by combining the input with the existing and correct stroke of the existing character. In this case, the recognized character is displayed by replacing the existing character with the newly recognized character.

In the preferred embodiment of the present invention, during the recognition of the input, only the character is considered. That is, the recognition is performed with respect to the character instead of a word or a sentence containing the character. In other words, the method according to the present invention may more applicable to an ideographic language such as Chinese and Japanese than an alphabet language such as English and Spanish. Notwithstanding, the present invention may be used for the alphabet language such as English and Spanish, as shown in FIGS. 2-7.

The method ends at 913.

Figure 10:
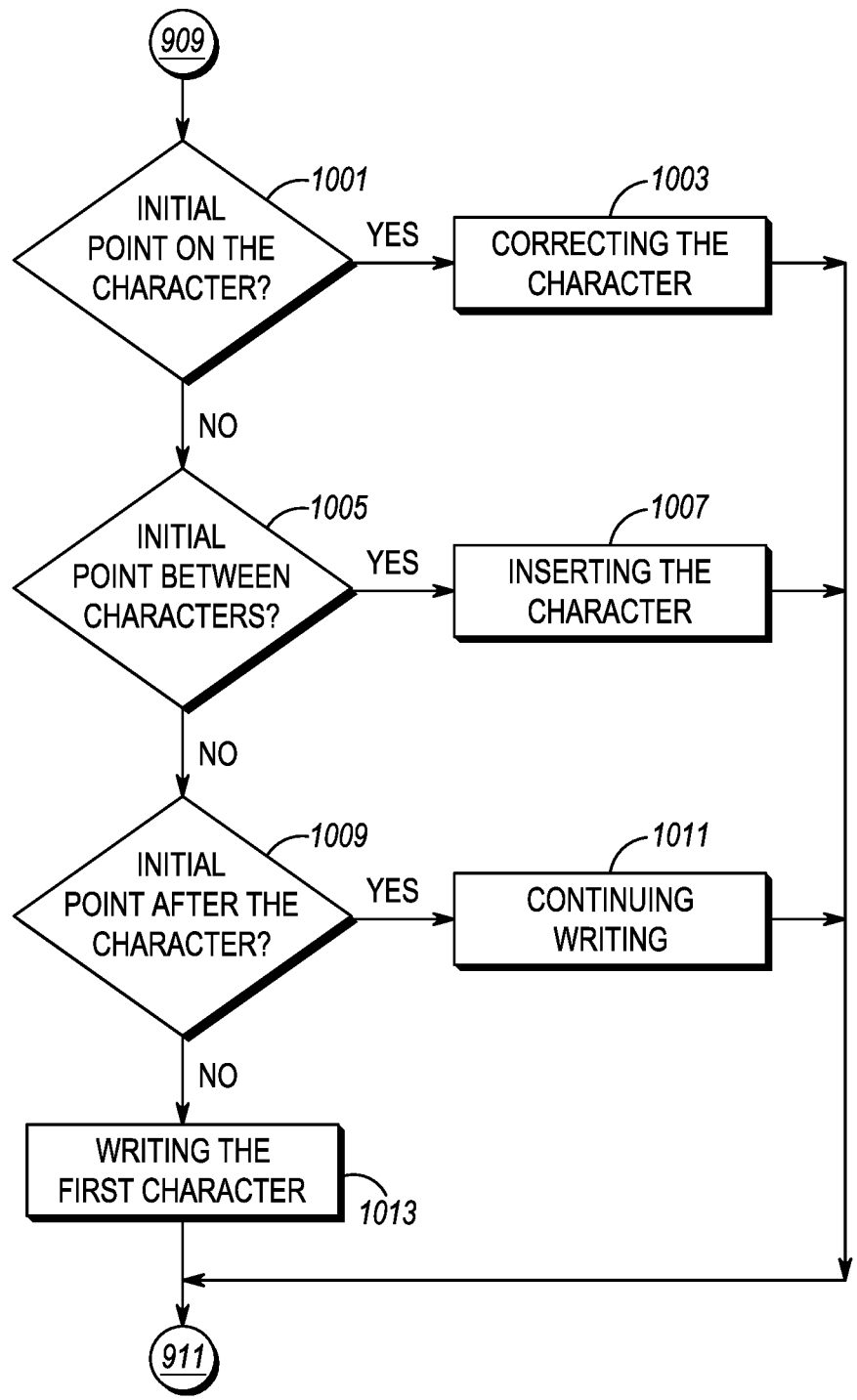
FIG. 10 is a flowchart illustrating a process for determining an operation of the handwriting input according to the embodiment of the present invention.

FIG. 10 is a flowchart illustrating a process for determining an operation of the handwriting input according to the embodiment of the present invention.

The process starts at 909 of FIG. 9.

At 1001, it is determined whether the position of the initial point falls on the existing character.

If the position of the initial point falls on the existing character ("YES" for 1001), the operation of the handwriting input is determined as correcting the existing character. Referring to FIGS. 5A, 5B, 7A, 7B, 7C, 8A, 8B, 8C, and 8D, the operation of correcting the existing character is performed at 1003. The correcting operation may includes replacing a wrong stroke with a new stroke or adding a missing stroke onto the existing character without repeatedly inputting an existing and correct stroke of the existing character. Then the process proceeds with 911 of FIG. 9.

If the position of the initial point of the handwriting input does not fall on an existing character ("NO" for 1001), at 1005, it is determined whether the position of the initial point of the handwriting input falls between two existing characters.

If the position of the initial point of the handwriting input falls between the two existing characters ("YES" for 1005), the operation of the handwriting input is determined as inserting a character between the two existing characters. Referring to FIGS. 6A, 6B, and 6C, the operation of inserting a character between the two existing characters is performed at 1007. Then the process proceeds with 911 of FIG. 9.

If the position of the initial point of the handwriting input does not fall between the two existing characters ("NO" for 1005), at 1009, it is determined whether the position of the initial point of the handwriting input falls after an existing character.

If the position of the initial point of the handwriting input falls after the existing character ("YES" for 1009), the operation of the handwriting input is determined as continuing writing a character after the existing character. Referring to FIGS. 3A and 3B, the operation of continuing writing a character after the existing character is performed at 1011. Then the process proceeds with 911 of FIG. 9.

If the position of the initial point of the handwriting input does not fall after the existing character ("NO" for 1009), the operation of the handwriting input is determined as writing a first character of a word or a sentence. Referring to FIGS. 2A, 2B, 2C, 4A, and 4B, the operation of writing a first character of a word or a sentence is performed at 1013. Then the process proceeds with 911 of FIG. 9.

The present invention improves the user experience when the user edits or corrects a character on a writing input device. According to the present invention, an input target is quickly determined by combining the input target locating operation with the directly user inputting/editing operation. In the correcting operation, the error character is quickly determined. Also in the correcting operation, an error input is quickly corrected. The user directly makes the input on the error character without firstly locating and deleting it. The device automatically combines the new input with the original error character for reorganization and then for recognition.

According to the embodiment of the present invention, an efficient and friendly way of editing and correcting the character on the handwriting device is provided. Specifically, a method for determining the input target by combining the input target locating operation with the actual user inputting/editing operation for editing the character on the handwriting device is provided. In another aspect, a method for determining and identifying the error input character for correcting operation on the handwriting device is provided. In a further aspect, a method for quickly correcting the error character on the handwriting device is provided. When correcting the error character, the handwriting device combines the new input with the original error character to try to recognize the user intended change.

The present invention provides some enhancement (with some tradeoffs) for western languages, but is significantly better for ideographic languages where the inclusion of a single stoke can completely change the meaning of a character.

With the present invention, the user experience can be improved greatly where the editing and correcting operations become efficiently and friendly. The present invention is much more useful for non-English languages such as Chinese, Japanese and such like. Typically those languages have complex shapes and more strokes, so the user usually prefers to make a handwriting input on an English based input device.

Moreover, the present invention permits improved handwriting recognition error correction by enabling the user to identify the word or character to be modified and make the addition/replacement directly, without having to explicitly select the erroneous word or character. In this fashion it also supports stroke addition or replacement to correct a prior entry error and update the selected character.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for inputting handwriting character, comprising:
    adding a handwriting input on a touch screen, where the touch screen has a plurality of input areas;
    detecting a position of an initial point of the handwriting input;
    determining an input area for the handwriting input among the plurality of input areas of the touch screen based on the position of the initial point of the handwriting input;
    determining an operation of the handwriting input based on the position of the initial point of the handwriting input and performing the determined operation, wherein the step of determining an operation of the handwriting input further comprises:
        if the position of the initial point of the handwriting input does not fall on an existing character, determining whether the position of the initial point of the handwriting input falls between two existing characters; and
        if it is determined that the position of the initial point of the handwriting input falls between the two existing characters, determining the operation of the handwriting input as inserting a character between the two existing characters; and upon completion of the handwriting input, recognizing the input as a character and displaying the recognized character in the determined input area on the touch screen.

2. The method of claim 1, wherein the step of determining an input area for the handwriting input among the plurality of input areas of the touch screen further comprises:

if the position of the initial point of the handwriting input falls in one of the plurality of input areas, determining the one of the plurality of input areas as the input area for the handwriting input.

3. The method of claim 1, wherein the step of determining an operation of the handwriting input further comprises:

if the position of the initial point of the handwriting input falls on an existing character, determining the operation of the handwriting input as correcting the existing character.

4. The method of claim 3, wherein correcting the existing character comprises: replacing a wrong stroke with a new stroke or adding a missing stroke onto the existing character without repeatedly inputting an existing and correct stroke of the existing character, wherein the step of recognizing the input as a character and displaying the recognized character further comprises:

recognizing the input as the character by combining the input with the existing and correct stroke of the existing character; and displaying the recognized character by replacing the existing character with the recognized character.

5. The method of claim 1, wherein:

if it is determined that the position of the initial point of the handwriting input does not fall on the existing character and does not fall between the two existing characters, determining whether the position of the initial point of the handwriting input falls after an existing character; and if it is determined that the position of the initial point of the handwriting input falls after the existing character, determining the operation of the handwriting input as continuing writing a character after the existing character.

6. The method of claim 5, wherein:

if it is determined that the position of the initial point of the handwriting input does not fall on the existing character, does not fall between the two existing characters, and does not fall after the existing character, determining the operation of the handwriting input as writing a first character of a word or a sentence.

7. The method of claim 1, wherein the step of recognizing the input comprises recognizing the input by only considering the character, without considering a word or a sentence containing the character.

8. The method of claim 1, wherein the character is an alphanumeric character.

9. The method of claim 1, wherein the character is an ideographic character.

10. An electronic device for inputting handwriting character, comprising:

a touch screen having a plurality of input areas;
a memory configured to store non-transitory computer-executable instructions;

a processor, coupled to the memory and the touch screen, configured to perform a set of functions including:

adding a handwriting input on the touch screen;
detecting a position of an initial point of the handwriting input;
determining an input area for the handwriting input among the plurality of input areas of the touch screen based on the position of the initial point of the handwriting input;
determining an operation of the handwriting input based on the position of the initial point of the handwriting input and performing the determined operation, wherein the processor is configured to perform the function of determining an operation of the handwriting input by:

if the position of the initial point of the handwriting input does not fall on an existing character, determining whether the position of the initial point of the handwriting input falls between two existing characters; and if it is determined that the position of the initial point of the handwriting input falls between the two existing characters, determining the operation of the handwriting input as inserting a character between the two existing characters; and upon completion of the handwriting input, recognizing the input as a character and displaying the recognized character in the determined input area on the touch screen.

11. The electronic device of claim 10, wherein the processor is configured to perform the function of determining an input area for the handwriting input among the plurality of input areas of the touch screen by:

if the position of the initial point of the handwriting input falls in one of the plurality of input areas, determining the one of the plurality of input areas as the input area for the handwriting input.

12. The electronic device of claim 10, wherein the processor is configured to perform the function of determining an operation of the handwriting input by:

if the position of the initial point of the handwriting input falls on an existing character, determining the operation of the handwriting input as correcting the existing character.

13. The electronic device of claim 12, wherein the processor is configured to perform the function of correcting the existing character by replacing a wrong stroke with a new stroke or adding a missing stroke onto the existing character without repeatedly inputting an existing and correct stroke of the existing character, wherein the processor is configured to perform the function of recognizing the input as a character and displaying the recognized character by:

recognizing the input as the character by combining the input with the existing and correct stroke of the existing character; and displaying the recognized character by replacing the existing character with the recognized character.

14. The electronic device of claim 10, wherein the processor is further configured to perform the functions of:

if it is determined that the position of the initial point of the handwriting input does not fall on the existing character and does not fall between the two existing characters, determining whether the position of the initial point of the handwriting input falls after an existing character; and if it is determined that the position of the initial point of the handwriting input falls after the existing character, determining the operation of the handwriting input as continuing writing a character after the existing character.

15. The electronic device of claim 14, wherein the processor is further configured to perform the function of:

if it is determined that the position of the initial point of the handwriting input does not fall on the existing character, does not fall between the two existing characters, and does not fall after the existing character, determining the operation of the handwriting input as writing a first character of a word or a sentence.

16. The electronic device of claim 10, wherein the processor is configured to perform the function of recognizing the input by recognizing the input by only considering the character, without considering a word or a sentence containing the character.

17. The electronic device of claim 10, wherein the character is an alphanumeric character.

18. The electronic device of claim 10, wherein the character is an ideographic character.

\* \* \* \* \*